(12) United States Patent
Singer et al.

(10) Patent No.: US 9,275,671 B2
(45) Date of Patent: Mar. 1, 2016

(54) OPTICAL INFORMATION STORAGE MEDIUM

(75) Inventors: Kenneth Singer, Pepper Pike, OH (US); Chris Ryan, Ravenna, OH (US); Jie Shan, Cleveland Heights, OH (US); Joseph Lott, Hopkins, MN (US); Christophe Weder, Duedingen (CH); Brent Valle, San Jose, CA (US); Eric Baer, Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 14/124,890

(22) PCT Filed: Jun. 11, 2012

(86) PCT No.: PCT/US2012/041870
§ 371 (c)(1),
(2), (4) Date: Mar. 12, 2014

(87) PCT Pub. No.: WO2012/170992
PCT Pub. Date: Dec. 13, 2012

(65) Prior Publication Data
US 2014/0219072 A1    Aug. 7, 2014

Related U.S. Application Data

(60) Provisional application No. 61/494,966, filed on Jun. 9, 2011.

(51) Int. Cl.
*G11B 7/24*     (2013.01)
*G11B 7/004*    (2006.01)
(Continued)

(52) U.S. Cl.
CPC ............ *G11B 7/0079* (2013.01); *G11B 7/0052* (2013.01); *G11B 7/24038* (2013.01); *G11B 7/24065* (2013.01); *G11B 7/26* (2013.01);
(Continued)

(58) Field of Classification Search
None
See application file for complete search history.

(56) References Cited

U.S. PATENT DOCUMENTS 4,471,470 A * 9/1984 Swainson et al. ............. 365/127
5,263,793 A   11/1993 Sirovich
(Continued)

FOREIGN PATENT DOCUMENTS

EP     934587 A1    8/1999
EP     943141 A1    9/1999
(Continued)

OTHER PUBLICATIONS

Crenshaw et al., "Deformation-inducing color changes in mechochromic polyethylene blends", Macromol., vol. 40 pp. 2400-2408 (2007).*
(Continued)

*Primary Examiner* — Martin Angebranndt
(74) *Attorney, Agent, or Firm* — Tarolli, Sundheim, Covell & Tummino, LLP

(57) ABSTRACT

An optical information storage medium includes a multilayer film that includes a plurality of extruded alternating active data storage layers and buffer layers, which separate the active data storage layers. The active data storage layers and buffer layers have thicknesses that allow the active data storage layers to be writable by permanent or reversible one- or multiphoton, linear, nonlinear, or threshold optical writing processes to define data voxels within the active data storage layers that are readable by an optical reading device.

40 Claims, 7 Drawing Sheets

(51) Int. Cl.
- *B32B 3/02* (2006.01)
- *G03F 7/00* (2006.01)
- *G11B 7/007* (2006.01)
- *G11B 7/005* (2006.01)
- *G11B 7/24065* (2013.01)
- *G11B 7/24038* (2013.01)
- *G11B 7/26* (2006.01)
- *G11B 7/00* (2006.01)
- *G11B 7/246* (2013.01)

(52) U.S. Cl.
CPC ............. *G11B2007/0013* (2013.01); *G11B 2007/24624* (2013.01)

(56) References Cited

U.S. PATENT DOCUMENTS

| | | |
|---|---|---|
| 5,362,179 A | 11/1994 | Sirovich |
| 5,797,414 A | 8/1998 | Sirovich |
| 5,833,389 A | 11/1998 | Sirovich |
| 5,912,257 A * | 6/1999 | Prasad et al. ............... 514/356 |
| 5,936,878 A | 8/1999 | Arsenov |
| 5,945,252 A | 8/1999 | Sokoluk |
| 6,009,065 A | 12/1999 | Glushko |
| 6,027,855 A | 2/2000 | Sokoluk |
| 6,039,898 A | 3/2000 | Glushko |
| 6,071,671 A | 6/2000 | Glushko |
| 6,265,140 B1 | 7/2001 | Levich |
| 6,280,904 B1 | 8/2001 | Sokoluk |
| 6,291,132 B1 | 9/2001 | Glushko |
| 6,309,729 B1 | 10/2001 | Glushko |
| 6,338,935 B1 | 1/2002 | Alperovich |
| 6,500,602 B1 | 12/2002 | Magnitskii |
| 6,507,545 B2 | 1/2003 | Levich |
| 6,522,616 B1 | 2/2003 | Magnitski |
| 6,682,799 B1 | 1/2004 | Alperovich |
| 6,721,257 B2 | 4/2004 | Alperovich |
| 6,819,649 B1 | 11/2004 | Magnitski |
| 6,835,431 B1 | 12/2004 | Alperovich |
| 6,960,426 B2 | 11/2005 | Levich |
| 7,082,093 B1 | 7/2006 | Magnitskii |
| 7,094,517 B1 | 8/2006 | Alperovich |
| 7,101,655 B1 | 9/2006 | Alperovich |
| 7,116,628 B2 | 10/2006 | Magnitski |
| 7,226,637 B2 | 6/2007 | Dorozhkina |
| 7,406,021 B2 | 7/2008 | Magnitski |
| 7,406,027 B2 | 7/2008 | Magnitskii |
| 7,936,802 B2 * | 5/2011 | Singer et al. ............... 372/92 |
| 8,144,744 B2 * | 3/2012 | Singer et al. ........... 372/50.124 |
| 2001/0019518 A1 | 9/2001 | Levich |
| 2001/0043398 A1 * | 11/2001 | Baer et al. ................... 359/588 |
| 2001/0048977 A1 | 12/2001 | Dorozhkina |
| 2002/0098446 A1 | 7/2002 | Alperovich |
| 2002/0105888 A1 | 8/2002 | Levich |
| 2002/0115026 A1 | 8/2002 | Malkin |
| 2003/0073031 A1 * | 4/2003 | Rentzepis et al. ....... 430/270.15 |
| 2003/0141607 A1 * | 7/2003 | Leiber et al. ................. 264/1.33 |
| 2004/0175656 A1 * | 9/2004 | Baer et al. ..................... 430/290 |
| 2005/0013966 A1 | 1/2005 | Alperovich |
| 2005/0087749 A1 | 4/2005 | Magnitski |
| 2006/0099376 A1 | 5/2006 | Magnitskii |
| 2006/0169401 A1 | 8/2006 | Magnitskii |
| 2006/0246376 A1 * | 11/2006 | Nishino ................... 430/270.15 |
| 2007/0053279 A1 | 3/2007 | Magnitskii |
| 2007/0154674 A1 | 7/2007 | Busman et al. |
| 2008/0013441 A1 * | 1/2008 | Oouchida .................. 369/275.4 |
| 2008/0038455 A1 | 2/2008 | Levich |
| 2008/0124661 A1 | 5/2008 | Gore |
| 2008/0248411 A1 * | 10/2008 | Irie et al. ........................ 430/10 |
| 2010/0056775 A1 * | 3/2010 | Tomura et al. ................ 540/121 |
| 2010/0098126 A1 * | 4/2010 | Singer et al. ............. 372/50.11 |
| 2010/0302927 A1 * | 12/2010 | Natarajan et al. ............. 369/103 |

FOREIGN PATENT DOCUMENTS

| | | |
|---|---|---|
| EP | 943144 A1 | 9/1999 |
| EP | 963571 A1 | 12/1999 |
| EP | 965131 A1 | 12/1999 |
| EP | 1010174 A1 | 6/2000 |
| EP | 1027701 A1 | 8/2000 |
| EP | 1027703 A1 | 8/2000 |
| EP | 1036129 A1 | 9/2000 |
| EP | 810995 A4 | 1/2001 |
| EP | 1090391 A1 | 4/2001 |
| EP | 1103046 A2 | 5/2001 |
| EP | 1119782 A1 | 8/2001 |
| EP | 1155409 A1 | 11/2001 |
| EP | 1166263 A1 | 1/2002 |
| EP | 1131202 A4 | 2/2002 |
| EP | 1419503 A1 | 5/2004 |
| EP | 1425739 A1 | 6/2004 |
| EP | 1579429 A2 | 9/2005 |
| EP | 1428167 A4 | 8/2006 |
| JP | 58-022135 * | 2/1983 |
| WO | 9530909 A1 | 11/1995 |
| WO | 98/21521 * | 5/1998 |
| WO | 9825262 A1 | 6/1998 |
| WO | 9825268 A1 | 6/1998 |
| WO | 9828739 A1 | 7/1998 |
| WO | 9828740 A1 | 7/1998 |
| WO | 9831018 A1 | 7/1998 |
| WO | 9837456 A1 | 8/1998 |
| WO | 9850914 A1 | 11/1998 |
| WO | 9909550 A1 | 2/1999 |
| WO | 9909551 A1 | 2/1999 |
| WO | 9910881 A1 | 3/1999 |
| WO | 9923647 A1 | 5/1999 |
| WO | 9923649 A1 | 5/1999 |
| WO | 9923650 A1 | 5/1999 |
| WO | 9923652 A1 | 5/1999 |
| WO | 9924527 A1 | 5/1999 |
| WO | 9947327 A1 | 9/1999 |
| WO | 9959142 A2 | 11/1999 |
| WO | 0005624 A1 | 2/2000 |
| WO | 0015425 A1 | 3/2000 |
| WO | 0048177 A1 | 8/2000 |
| WO | 0048178 A2 | 8/2000 |
| WO | 0055850 A1 | 9/2000 |
| WO | 0106501 A2 | 1/2001 |
| WO | 0106505 A1 | 1/2001 |
| WO | 0129835 A1 | 4/2001 |
| WO | 0129837 A1 | 4/2001 |
| WO | 0141131 A2 | 6/2001 |
| WO | 0153065 A1 | 7/2001 |
| WO | 0157860 A2 | 8/2001 |
| WO | 0193258 A2 | 12/2001 |
| WO | 0211050 A2 | 2/2002 |
| WO | 0219255 A1 | 3/2002 |
| WO | 0247012 A2 | 6/2002 |
| WO | 0247074 A2 | 6/2002 |
| WO | 0249009 A2 | 6/2002 |
| WO | 02096633 A1 | 12/2002 |
| WO | 03001512 A2 | 1/2003 |
| WO | 03001516 A1 | 1/2003 |
| WO | 03005283 A2 | 1/2003 |
| WO | 03007230 A2 | 1/2003 |
| WO | 03007297 A1 | 1/2003 |
| WO | 2007063353 A2 | 6/2007 |
| WO | 2008053266 A2 | 5/2008 |
| WO | 2010/075340 * | 7/2010 |

OTHER PUBLICATIONS

Lott, Joseph, et al., "Two Photon 3D Optical 7, 8 Data Storage Via Aggregate Switching of Excimer-Forming Dyes", Advanced Materials, vol. 23, No. 21, Apr. 21, 2011, pp. 2425-2429.

European Search Report dated Mar. 16, 2015.

* cited by examiner

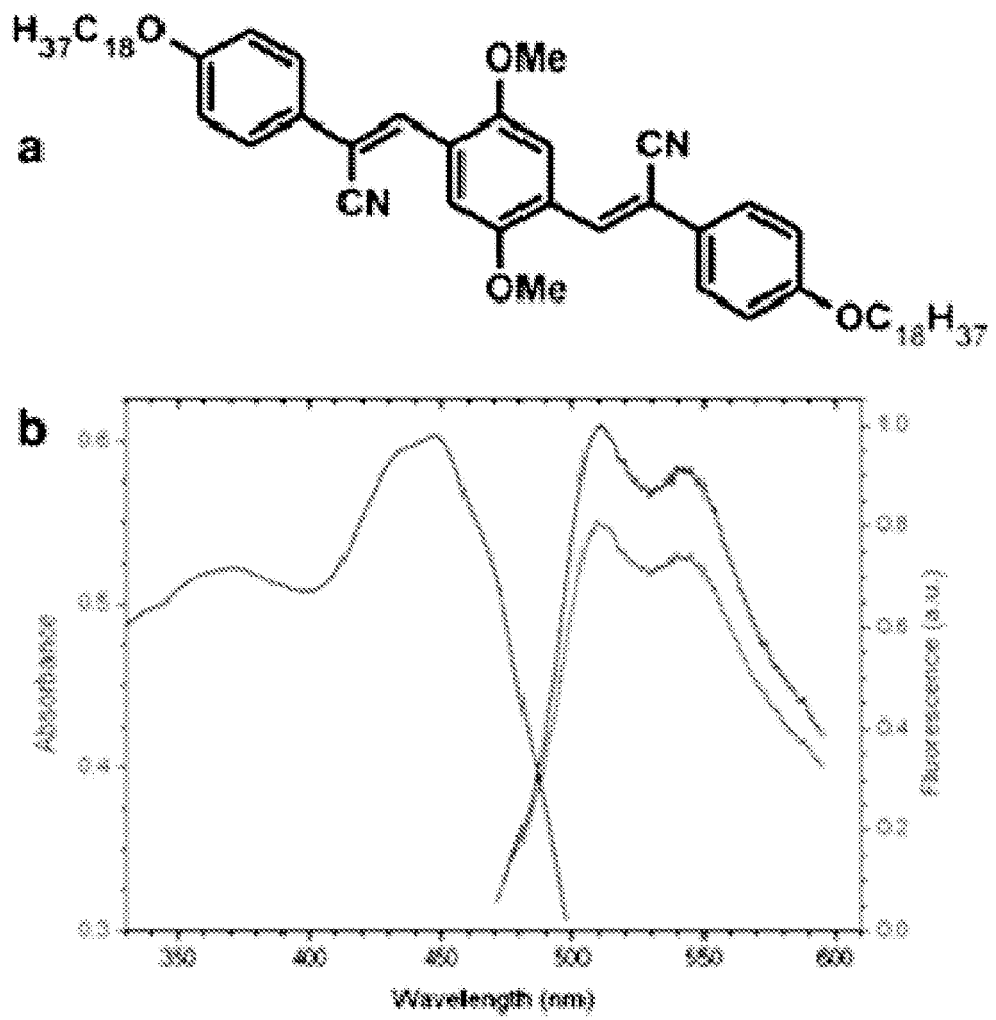
Figs. 5A-B

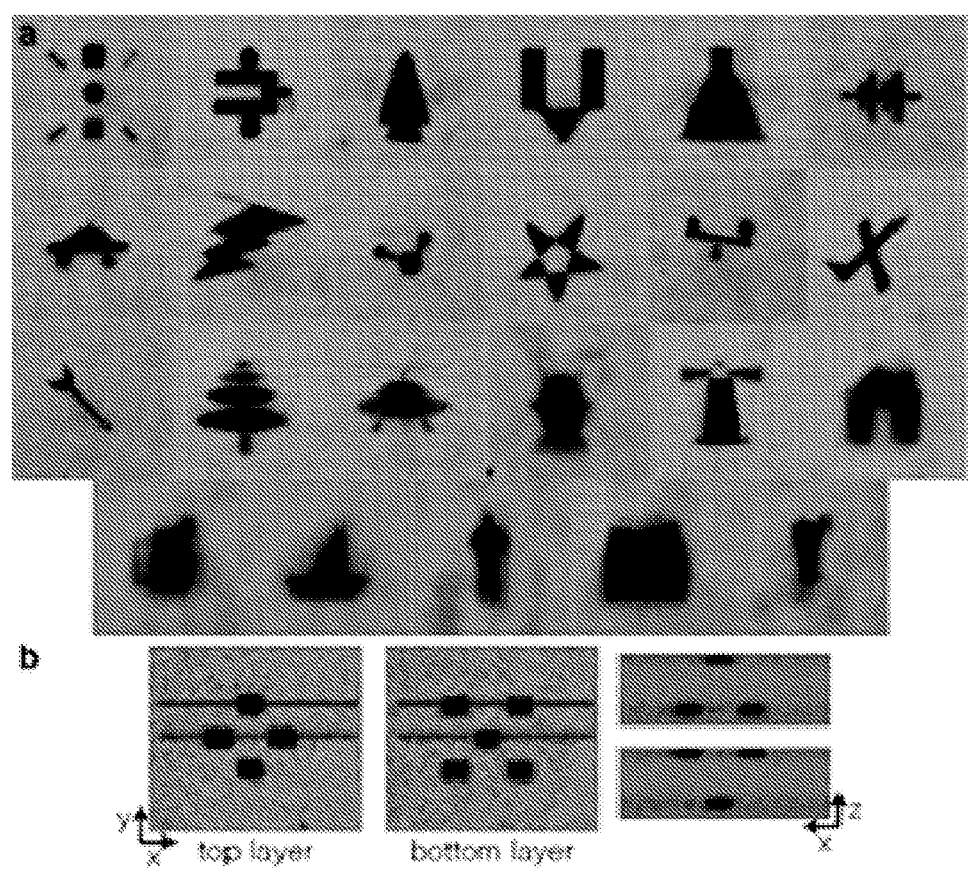
Figs. 6A-B

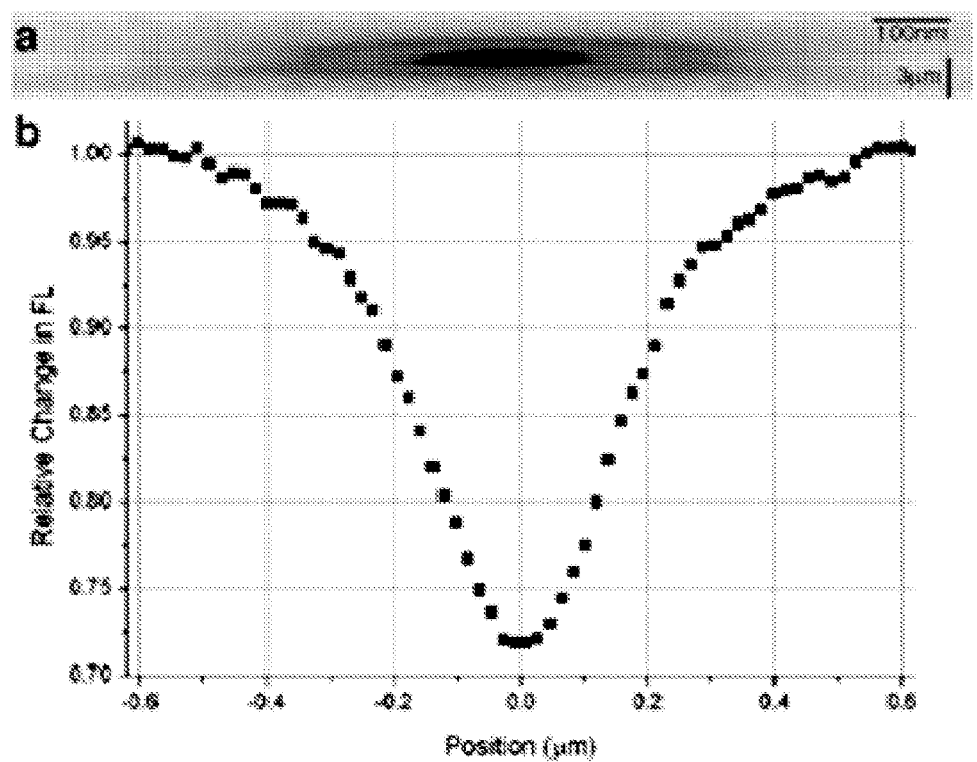
Figs. 7A-B

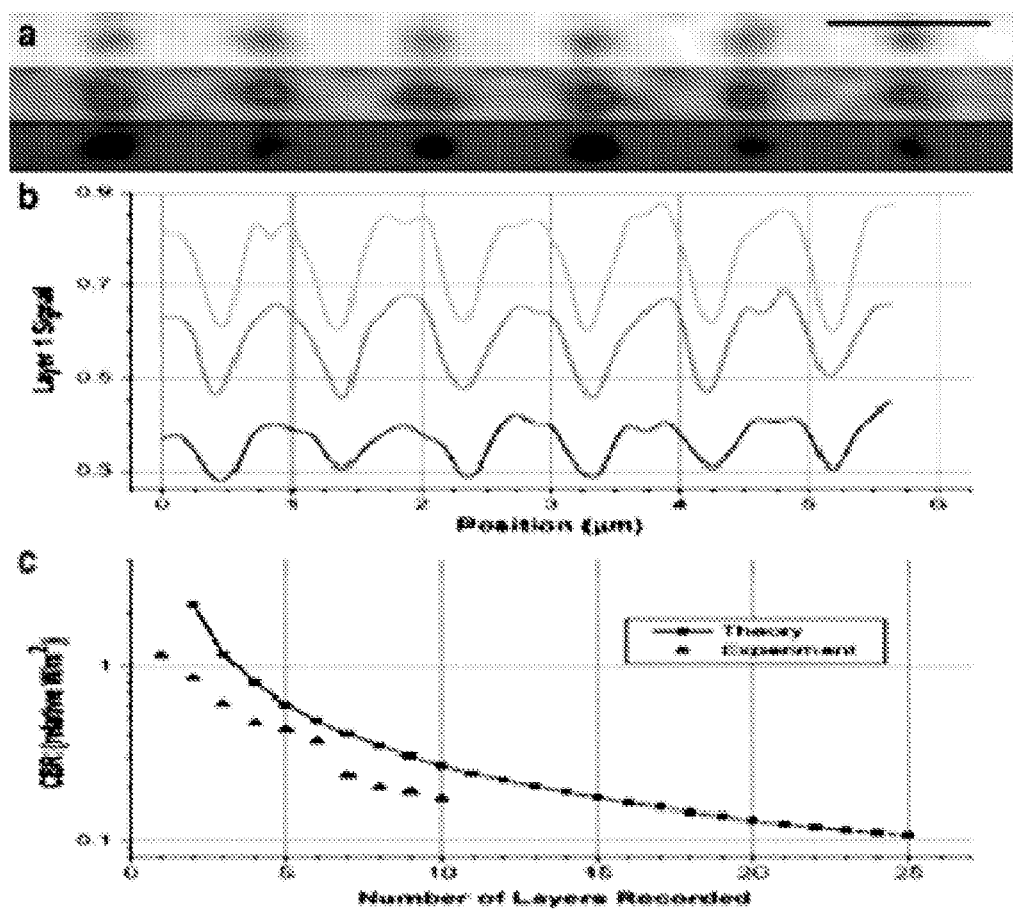
Figs. 8A-C

OPTICAL INFORMATION STORAGE MEDIUM

RELATED APPLICATION

This application claims priority from U.S. Provisional Application No. 61/494,966, filed Jun. 9, 2011, the subject matter of which is incorporated herein by reference in its entirety.

GOVERNMENT FUNDING

This invention was made with government support under Grant No. RES501499 awarded by The National Science Foundation. The United States government may have certain rights to the invention.

TECHNICAL FIELD

The application relates to an optical information storage medium and, in particular, relates to a three-dimensional multilayer optical information storage medium that is formed using a polymer extrusion process.

BACKGROUND

Media capable of patterning by light exposure are a common manifestation of information storage. In one of the oldest techniques, photographic emulsions are used to record the image of the light incident upon it. There is recently an increased demand for storage of information by optical means, for use in archiving, security tags, 3D representation of images, aberration correction, and storage of digital data. In order to achieve the desired optical response or a larger optical response, 3D media are used. Furthermore, the areal information capacity is limited by the optics of the read/write system. For example, holographic stereograms require small lateral features to achieve high image resolution, as well as thick media to achieve large image contrast. Additional increases in capacity require additional dimensions, which might include the spatial thickness dimension, but also could include color, polarization, or phase multiplexing.

The main approaches to entry into the third spatial dimension involve either multilayer information storage or holographic information storage. Multilayer storage can be affected either by physical layers, or optical layering provided by localization near the focus of the lasers using multiphoton absorption. These approaches, however, have significant limitations. Holographic storage requires complicated and potentially costly optical read/write hardware. Similarly, the lasers needed for multiphoton absorption are more complicated, costly, and introduce additional sources of noise. Physical multilayering employs simpler hardware, but the manufacturing of multiple layers in the storage medium has proven to be difficult to scale up economically.

SUMMARY

Embodiments of the application relate to an optical information storage medium that includes a multilayer film. The multilayer film includes a plurality of extruded alternating active data storage layers and buffer layers, which separate the active data storage layers. The active data storage layers and buffer layers have thicknesses that allow the active data storage layers to be writable to define data voxels (e.g., discrete bits, images, shapes, holograms, etc.) within the active data storage layers that are readable by an optical reading device. The optical information storage medium is compatible in formats including but not limited to disks, rolls, cards, stickers, paper, or laminated onto flexible or non-flexible substrates.

The optical information storage medium can be designed to accommodate three-dimensional data storage that is compatible with existing optical read/write technology and an appropriate permanent or reversible one- or multiphoton, linear, non-linear or threshold optical writing scheme. The medium can be applied to the storage of digital information, incorporated onto an information bearing document for security, identification, bar codes, product tracking, tamper resistant packaging, production of information bearing diffractive elements, such as holograms, stereograms, holographic optical element, holographic diffusers, and photonic paper.

Layering of the physical medium enables information, localized in three dimensions, to be written and subsequently read with high signal-to-noise. Such enhancement can arise from confinement of the active data storage layers to thin layers of well-defined separation, providing for precise location of the data during reading, reduced interlayer cross-talk, reduced parasitic absorption from areas outside of the focal region, and reduced aberration from having less scattering material. In addition to the active and buffers layers, other layers may be readily included in the multilayer film. These other layers can provide, for example, a signal for tracking depth within the medium, or for storing metadata, cryptographic information, checksums, codecs, or firmware.

In some embodiments, the active data storage layers can include a material that undergoes an optically induced localized change of optical properties when written by the appropriate permanent or reversible one- or multiphoton, linear, non-linear or threshold optical writing process. The change in optical properties can include but is not limited to at least one of a change of fluorescence color, fluorescence intensity, absorption color, transparency, scattering, reflectivity, refractive index, or polarization that is brought about by chemical or physical changes of the material. The material can include a polymer and/or additives that exhibit the optically induced physical, thermal, or chemical changes leading to changes of their optical properties.

In other embodiments, the active data storage layers can include a host polymer material and a fluorescent dye. The fluorescent dye can be reversible by exposure to light between a first condition exhibiting a first fluorescence and a second condition exhibiting a second fluorescence different from the first fluorescence. The fluorescent dye can also be bleached by exposure to light. The fluorescent dye can be one of an excimer-forming, fluorescent dye, an aggregachromic dye, or a photobleachable fluorescent dye. In one example, the fluorescent dye is a cyano-substituted oligo(phenylene vinylene) dye.

In still other embodiments, the active data storage layer can include a host polymer material and an inorganic nanoparticle and/or dye. The absorption, photoluminescence, or refractive index of the active data storage layer can be modified or changed by exposure to light.

In other embodiments, the optical information storage medium can be used for storage of images or an image in a color shifting film on information bearing documents, or in a diffractive multilayer film for production of hologram or hologram-like properties.

Other objects and advantages and a fuller understanding of the invention will become apparent from the following detailed description of the preferred embodiments and the accompanying drawings.

BRIEF DESCRIPTION OF THE DRAWINGS

FIG. 5 illustrates (A) chemical structure of the dye (C18-RG). (B) Absorption of the entire 200 μm thick ML film, containing 64 active layers, and the FL spectra of a single layer before and after writing indicating a typical level of FL reduction induced by writing.

FIG. 6 illustrates (A) patterned images stored in the 23 layer film (false color). Top left is the uppermost layer and bottom right is the innermost layer, with subsequent layers going from left to right. (B) Cross-section of two layers after writing complementary images. The top cross-section is along the blue line, and the bottom along the red line. Images are normalized to the background. Each image is 22 μm square, containing 512 pixels.

FIG. 7 illustrates (A) cross-section of single written line in a 5 μm thick single active layer. The raw FL intensity was normalized by background and averaged over the length of the line. (B) Intensity profile of the spot at the waist, with a FWHM of 380 nm.

FIG. 8 illustrates (A) FL images of a series bits in layer 1 after recording layer 1 itself (top), layers 1-5 (middle), and layers 1-10 (bottom). Images have the same brightness and contrast settings. FIG. 8(B) shows the modulation signal of the images in (A). FIG. 8(c) illustrates the experimentally measured CBR of layer 1 (triangles) versus the number of layers recorded, along with the theoretical predictions (squares).

DETAILED DESCRIPTION

Embodiments of this application relate to an optical information storage medium and to a method of forming the optical information storage medium using a multilayer extrusion process. The optical information storage medium includes a multilayer film that can be provided in a variety of formats (e.g., disks, rolls, cards, stickers, paper, or laminated onto flexible or non-flexible substrates) with total writable areas sufficient for up to petabyte-scale data capacity when used, for example, in digital optical data storage. The reading/writing or recording of the data, such as bits, images, shapes, and holograms, can be performed with existing read/write technology (e.g., existing laser technology) and other appropriate permanent or reversible one- or multiphoton, linear, nonlinear, or threshold optical writing processes or schemes. The combination of appropriate permanent or reversible one- or multiphoton, linear, nonlinear, or threshold optical writing schemes and layering of the physical medium enables data, localized in three dimensions, to be written and subsequently repeatedly read with substantially improved signal-to-noise compared to existing technologies. The multilayer extrusion process used to fabricate the optical information storage medium can provide a multilayer film that includes from tens to hundreds of layers at a marginal cost per additional layer, yielding very high capacity data storage at a low cost.

Figure 1:
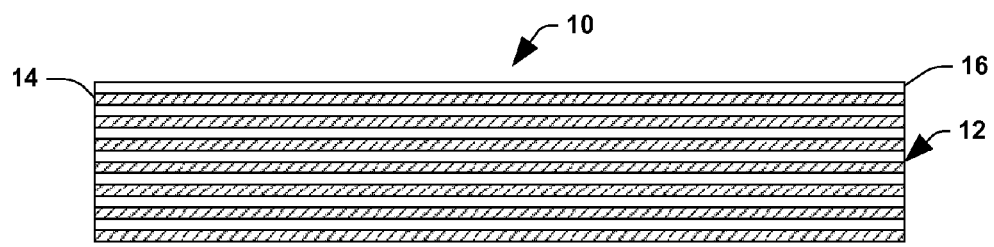
FIG. 1 is a schematic illustration of an optical information storage medium in accordance with an aspect of the application.

FIG. 1 is a schematic illustration of an optical information storage medium 10 in accordance with an embodiment of the application. The optical information storage medium 10 includes a multilayer film 12 that is formed from a plurality of extruded alternating active data storage layers 14 and buffer layers 16. The buffer layers 16 can separate the active data storage layers 14 to provide a well defined separation or buffering between the active data storage layers 14, which allows for precise location of the data during reading or writing the data, reduced interlayer cross-talk, and reduced parasitic absorption during writing or reading of the active data storage layers 14.

The active data storage layers 14 can include a thermo-sensitive, photosensitive, or otherwise changeable material that is amenable to optical writing and reading schemes. In some embodiments, the material can undergo an optically induced or thermally induced localized change of optical properties as a result of the writing process. The localized change in optical properties can define data voxels in the active data storage layer that can be read using an optical reading device. The change in optical properties can include, for example, a change of fluorescence color, fluorescence intensity, absorption color, transparency, scattering, reflectivity, refractive index, or polarization that is brought about by chemical or physical changes of the material due to the writing process.

By "data voxel" it is meant a three-dimension spatial unit of information encoded in the variations, which can be binary or continuous, in at least one optical property including, but not limited to, strength, spectrum, polarization, phase of the emission, absorption, reflection, and scattering. The data voxels can have any shape or configuration and be in the form of, for example, discrete bits, images, shapes, and/or holograms. It will be appreciated that the size and/or shape of the data voxels is limited only by the writing process used to form the data voxels and the size of active storage layers in which the data voxels are formed. In one example, the stored data voxels can include the user data and/or data to control or guide the read/write equipment. In another example, the data voxels can include images, such as an image in a color shifting film on information bearing document.

In some embodiments, the active data storage layers 12 include a host polymer material and a photo-sensitive or thermo-sensitive additive material, such as a photochromic, fluorescent, aggregachromic dopant or dye, and/or particle additives, which is dispersed or provided in a host polymer material. Collectively, the polymer material and the photo-sensitive or thermo-sensitive additive material may form a polymer matrix that can be readily extruded to form the active data storage layers.

In other embodiments, the polymer material used to form the active storage layers can be photo-sensitive or thermo-sensitive itself without the addition of a photochromic, fluorescent, aggregachromic dopant or dye, and/or particle additives. Such photo-sensitive or thermo-sensitive material can form a polymer matrix that can be readily extruded to form the active data storage layers.

The polymer material can be any natural or synthetic solid, or high-viscosity thermoplastic material that can be extruded or coextruded and that allows adequate incorporation of the photo-sensitive or thermo-sensitive materials either as part of the polymer molecular structure or as an additive, or both. The polymer material can also be substantially optically transparent and allow segregation and/or aggregation of the photo-sensitive or thermo-sensitive materials within the polymer. Examples of polymers that can be used are natural and synthetic polymers, including, but not limited to, polyolefins, such as polyethylenes (including linear low density polyethylene, low density polyethylene, high density polyethylene, ultra high molecular weight polyethylene) and poly(propylene), cyclic olefin polymers and copolymers, poly(acrylate)s, such as poly(methyl methacrylate), poly methacrylate, polybutyl acrylate, poly(acrylamide), poly(acrylonitrile), vinyl polymers, such as poly(vinylchloride), poly(vinylidenechloride), poly(vinylfluoride), poly(vinylidenefluoride), poly(tetrafluoroethylene), poly(chlorotrifluoroethylene), poly(vinylacetate), poly(vinylalcohol), poly(2-vinylpyridine), poly(vinyl butyral), poly(styrene)s, copolymers such as acrylonitrile butadiene styrene copolymer, ethylene vinyl acetate copolymers, polyamides, such as polyamide 6 and 6,6, polyamide 12, polyamide 4,6, polyesters, such as poly(ethylene terephthalate), poly(butylene terephthalate), and poly(ethylene naphthalate), poly(carbonate)s, polyurethanes, poly(aryl sulfones), poly(phenyleneoxide), as well as blends or composites comprising two or more of the heretofore mentioned or other compounds. Additionally, the host polymer material may be an elastomer, such as styrene-butadiene copolymers, polybutadiene, ethylene-propylene copolymers, polychloroprene, polyisoprene, nitrile rubbers, silicone rubbers or thermoplastic elastomers.

The photo-sensitive or thermo-sensitive additive can include any material that can be readily mixed or dispersed, e.g., melt blended, with or in the polymer material and exhibits a first readable state (e.g., conformance, color, fluorescence, distribution, and/or reflectance) prior to writing with a light source, such as a laser, and a second different readable state, (e.g., conformance, color, fluorescence, distribution and/or reflectance) after writing. In one example, the photo-sensitive or thermo-sensitive material can include particle additives, such as functional nanoparticles and/or nanoparticles with functional additives on their surface or volume. Examples include semiconductor, metal or glass nanoparticles with or without polymer and/or dye surfactants or dyes doped into their volumes.

In another example, the photo-sensitive or thermo-sensitive material can include any dye that is capable of emitting a different emission spectrum based upon the state of matter or the environment to which the dye has been exposed. The dye may be, for example, a two-photon absorbing dye, such as a dye that forms excimers that emit a different emission spectrum, i.e., fluorescence, based upon the relative concentration of the excimers to the host material or a dye that emits a different spectrum based upon the supramolecular relationship between the dye and the host material, other dye molecules or another chemical compound in the optical information storage medium, e.g., the buffer layer. The dyes can be used alone and/or in combination with nanoparticles where interactions between and among dyes and nanoparticles such as charge and energy transfer can be used to store data.

Examples of fluorescent dyes include, but are not limited to, an excimer-forming, fluorescent dye and an aggregachromic dye. In some embodiments, the aggregachromic dye can include a cyano-substituted oligo(phenylene vinylene) (cyano-OPV) dye compound, such as, but not limited to, cyano-OPV C18-RG, 1,4-Bis-(α-cyano-4-methoxystyryl)-benzene, 1,4-bis-(α-cyano-4-methoxystyryl)-2,5-dimethoxybenzene, and 1,4-bis-(α-cyano-4-(2-ethylhexyloxystyryl)-2,5-dimethoxybenzene and 2,5-bis-(α-cyano-4-methoxystyryl)-thiophene. Examples of other dyes that may be used in the active data storage layers are disclosed in U.S. Pat. No. 7,223,988, the entirety of which is incorporated by reference herein in its entirety.

It will be appreciated that aspects of the application can include controlling the emission color of a given fluorescent dye over a wide range by merely tuning, for example, the extent of π stacking between the limiting states of crystalline solid and molecular liquid solution. The emission spectrum of the color tunable, fluorescent dye may shift any measurable amount between its crystalline solid and molecular liquid states. The emission spectrum of a color tunable, fluorescent dye in the polymer material or optical information storage medium depends on several factors, such as, the concentration of dye in the host polymer, the solubility of the dye in the host polymer, the polarity of the host polymer, the ability of the dye to form aggregates or excimers, the degree of bathochromatic shift of the dye excimers relative to the host material or buffer layer, the degree of exposure to heat or light, external pressure applied to the optical information storage medium and the usage the optical information storage medium has experienced. Other factors of particular interest to certain applications include the ability to change the emission spectrum of the optical information storage medium based on a mechanical deformation. Therefore, a shift in the emission spectrum of the optical information storage medium may occur if the optical information storage medium is subjected to mechanical deformation, a temperature change via heat and/or light, aging of the optical information storage medium, a pressure change or an environmental change, such as exposure to a chemical compound, as well as other factors.

It will also be appreciated that the emission spectrum depends on the chemical and physical interactions of the dye molecules and/or particles (e.g., nanoparticles) with other compounds in the host polymer. These interactions may include dye molecule-dye molecule interactions, dye molecule-polymer molecule interactions or interactions between the dye molecule and other compounds and/or particles (e.g., nanoparticles) in the host material. For example, excimer formation of the dye in the host material may cause a large bathochromatic shift in the emission spectrum of the optical information storage medium. Subsequent annealing or cold working, as well as other forces and factors, may reduce the number of excimers in the host material and therefore shift the emission spectrum more toward that of the dilute solution of the dye. Other factors may increase the number of excimers in the host polymer and result in a shift of the spectrum more toward the spectrum of the crystalline solid. The segregation and aggregation of the dye in the host material may be reversible or irreversible.

The properties and functionality of the dye and/or particles incorporated in the polymer material may be chosen such that the solubility and diffusion characteristics of the dye in the polymer material meet the desired application. These properties such as the degree of branching, the length of branching, molecular weight, polarity, functionality, as well as other properties may be used to vary the rate or degree of bathochromatic shift of the emission spectrum based upon the degree of external stimulation that the optical information storage medium experiences.

In some embodiments, a writing scheme based on one- or two- or multi-photon absorption can be used to locally modify the fluorescent property of the active data storage layer so as to generate or define data voxels, such as bits, images, shapes, and/or holograms, in the active data storage layers. For example, the optical information storage medium can be in the shape of a disk and spun as a laser writing beam is focused onto the disk that is effective to locally change the fluorescent properties of a voxel in the active storage layers. Alternatively, the optical information storage medium can be kept stationary while the writing beam is moved. During the reading process, a laser source can be used to excite fluorescence that can be collected by optics and sent through a bandpass filter to a photodetector. The detected modulated fluorescence can be converted to a modulated binary electrical signal for further processing. Alternately, for systems that emit more than one color, simultaneous detection and processing of different fluorescence components by photodiodes with appropriate filters can be used to enhance the contrast or even the storage density.

In other embodiments, writing and reading of the active data storage layers can be based on changes in the local refractive indices within the active data storage layers. The active data storage layers can include, for example, photochromic, crystallizable materials or some other combination of materials whose reflective properties changes when patterned and used for writing/reading data. In some embodiments, the writing beam can change the index of refraction of a voxel by inducing a local chemical or physical change. In the crystallizable system, the writing beam can locally address a voxel inducing a change to the local phase of the material. A disk comprising such active data storage layers can then be read by detection of differences in the reflectivity. Reading can also be performed by imaging or detection of an optical interference pattern.

The buffer layers that separate the active data storage layers can include an inert material, such as a substantially optically transparent polymer, that does not include the same photosensitive material or thermo-sensitive material as the active data storage layer. The buffer layers may be devoid of photosensitive or thermo-sensitive material, or can include a photosensitive or thermo-sensitive material, or parts of the photosensitive or thermo-sensitive material used in the active data storage layers. However, the buffer layer may not change in the same way or to the same degree as the active layer when the disk is prepared and written. In some embodiments, the buffer layers can have a refractive index that is matched to the active storage layers to allow the active data storage layers to be readily written and read.

The polymers used to form the buffer layers can allow the buffer layers to be extruded alone or coextruded with active data storage layers. The polymer materials may be the same as or different than the polymer materials used to form the active storage layers. In some embodiments, the polymer material used to form the buffer layers can be a thermoplastic polymer that upon melting has a viscosity that matches the viscosity of the polymer material used to form active data storage layers and that allows the buffers layers to be coextruded with the active data storage material. In addition to the polymers noted above, the polymer materials can be an optical polymer, such as an optical polycarbonate, optical polyimide, optical silicone adhesive, optical UV adhesive or optical lacquers. Examples of optical polymers include Macrolon® CD 2005/MAS130, Macrolon® DP 1-1265, Macrofol® DE 1-1 of Bayer AG or Duramid® of Rogers Corp., Ultem® of GE Plastics, Al-10® of Amoco, etc. Regardless, the optical properties of the buffer layer do not change in the same way or to the same degree as the active data storage layers.

The thicknesses of the active data storage medium layers relative to the thicknesses of the buffer layers can be selected to allow the active data storage layers to be writable by appropriate permanent or reversible one- or multiphoton, linear, nonlinear, or threshold optical writing processes to define data voxels (e.g., discrete bits, images, shapes, or holograms) within the active data storage layers that are readable by an optical reading device. In some embodiments, the thicknesses can be selected for the appropriate permanent or reversible one- or multiphoton, linear, nonlinear, or threshold optical writing processes, for the wavelength and focal properties of the writing beam, for increasing the information storage density, for decreasing interlayer cross-talk, for consideration of the optical apparatus used to read data from the medium, or for any combination of the above. By properly designing the thickness of the active data storage layer 14 and that of the buffer layer 16 and/or the combined thickness of the layers 14 and 16, the signal-to-noise ratio (SNR) within the optical information storage medium can be greatly enhanced. The SNR is determined by the size of the data voxel and voxel cross-talk, in combination with the noise of the photodetectors. The multilayered construction of the optical information storage medium described herein—in contrast to conventional monolithic data storage media—significantly boosts the SNR, which enables the use of simpler, lower-cost optics.

In some embodiments, the active data storage layer and the buffer layers can have layer thickness of about 5 nm to about 100 µm. In other embodiments, the thickness of the active data storage layers can be about 5 nm to about 10 µm and the thickness of the buffer layers can be about 25 nm to about 100 µm.

Figure 2:
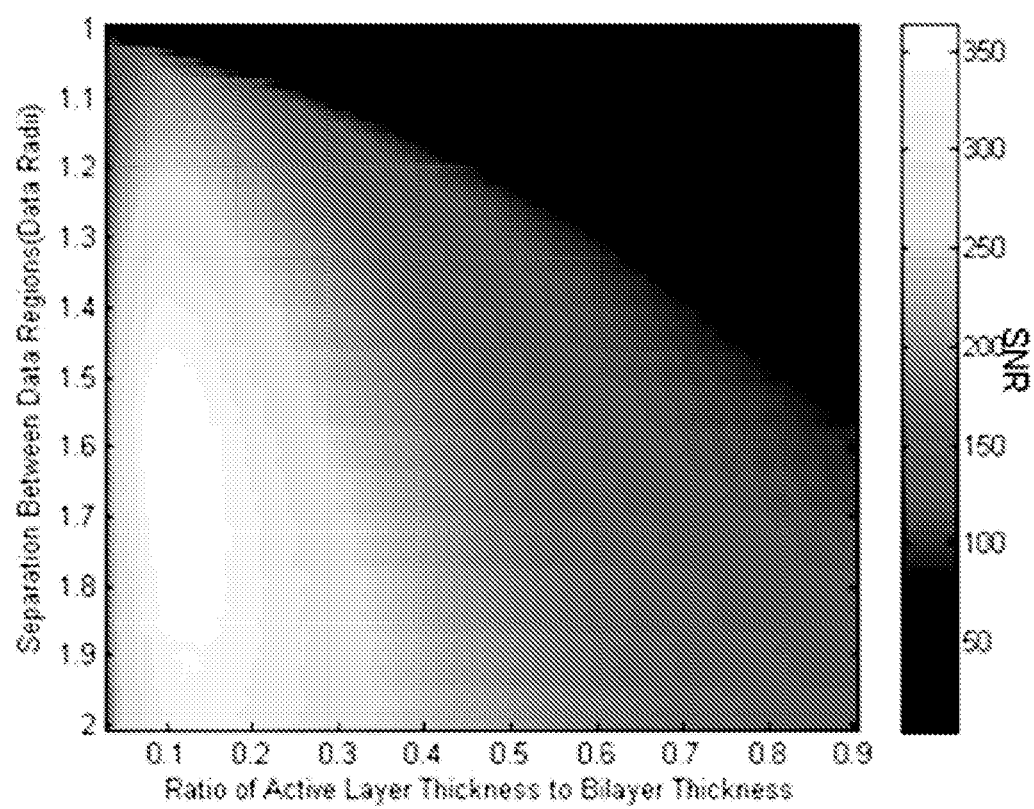
FIG. 2 is a graph illustrating various separations between data layers (y-axis) and the signal to noise ratio (SNR) of a storage medium augmented as the layer containing the data is made smaller (x-axis).

The geometry and thickness of the multilayer film as well as individual layers of the film has pronounced effect on the SNR of the optical information storage medium. By way of example, FIG. 2 illustrates the correlation between the ratio of an active data storage layer thickness (A) to the bilayer thickness (AB) and the SNR of a simulated optical information storage medium that includes a fluorescent active data storage layer. In this simulation, the optical information storage medium is illuminated by a 405 nm laser diode with 0.85 NA focusing optics and fluorescence is collected by the same optics and passed through a confocal pinhole with 10 µm diameter before being detected by a photodiode with 1 µA dark current. The active data storage layer (A) to bilayer (AB) thickness ratio of approximately 0.1 leads to a factor of up to 350 improvement in the SNR over a monolithic device under certain write/read conditions. Such an enhancement arises from the confinement of the active storage data storage medium to thin layers of well-defined separation, providing for precise location of the data during reading, thereby reducing interlayer cross-talk and parasitic absorption from layers outside of the focal region. Typically, a confocal microscope is necessary to read data that is stored in the form of fluorescent voxels. With proper design constraints, however, the optical information storage medium described herein with such a high SNR can be operated without the confocal setup or with significantly relaxed design constraints on the confocal setup, thereby significantly simplifying the read apparatus and lowering system cost. Alternatively, the device can offer higher density storage than monolithic designs while keeping the same SNR.

In some embodiments, the SNR can be exploited to increase data packing density with two-photon writing schemes. The multilayer data storage medium can also employ a threshold one photon writing process that is compatible with known optical data storage technology and writing schemes. In this design, the optimum A/AB layer thickness ratio is maintained but overall thickness is matched to the value appropriate for a threshold one-photon writing scheme so that light focused into the disc writes in only the intended layer.

In a threshold one-photon writing scheme, for example, the active data storage medium layers can absorb the writing beam by a one-photon process leading to a local change in the optical properties, such as refractive index, absorption, or fluorescence, if the writing laser power is above a certain threshold value. The threshold, intrinsically nonlinear, behavior allows localization of data in all three dimensions. It also permits areal storage beyond the diffraction limit, thus leading to higher areal storage densities. The writing beam for these active data storage layers can be focused on a single writing layer and induce a local change in the optical properties of the single writing layer, distinct from any changes in surrounding buffer layers or active data storage layers. In the threshold one-photon writing scheme, a buffer layer which is substantially transparent to either the writing beam, reading beam or both can be used to reduce absorption of either or both beams while propagating to the addressed layer allowing deep layers to be accessed before the writing or reading beam is substantially absorbed.

The optical information storage medium may be formed using any extrusion process. In some embodiments, the optical information storage medium can be formed using a multilayer coextrusion process. As an example, the optical information storage medium may be formed by layering of active data storage layers and the buffer layers in a hierarchical structure as described and disclosed in U.S. Pat. No. 6,582,807, issued Jun. 24, 2003 to Baer et al. and U.S. Pat. No. 7,002,754, issued Feb. 21, 2006, to Baer et al, which are incorporated herein by reference in their entirety. In one embodiment, the optical information storage medium is made from two alternating layers (ABABA . . . ) of the active data storage layers (A) and the buffer layers (B), respectively. The active data storage layers (A) and the buffer layers (B) form a multilayered composite optical information storage medium represented by formula $(AB)_x$, where $x=(2)^n$, and n is the number of multiplier elements and is in the range of from 1 to 256 or higher.

A multitude of alternating layers (A) and (B) can form a multilayered composite optical storage medium comprising at least 2 alternating layers (A) and (B), preferably in excess of about 30 alternating layers. Each of the layers (A) and (B) may be microlayers or nanolayers. By utilizing the above described sequence of steps, a 3-D memory device, formed as the multilayered composite optical information storage medium is obtained. This structure consists of a plurality of active data storage layers (A) that can carry recorded information and are divided there between by a plurality of buffer layers (B). Each buffer layer (B) can be considered as a substrate for the next active data storage layer (A) to be arranged thereon or as a protective layer if there is no need for further active data storage layers.

The multilayered optical information storage medium may alternatively include more than two different layers. For example, a three layer structure of alternating layers (ABCABCABC . . . ) that has layers (A), (B), and (C), respectively, is represented by $(ABC)_x$, where x is as defined above. A structure that includes any number of different layers in any desired configuration and combination is included within the scope of the application described, herein such as (CACBCACBC . . . ). In such a three-component, multilayered composite optical information storage medium, the third layer (C) may constitute an active data storage layer different from the layer (A) or a buffer layer different from the layer (B). Alternatively, layer (C) may produce a fluorescence or reflectance that provides a signal, which can be used to maintain a constant focal depth into the medium during reading or writing.

Figure 4:
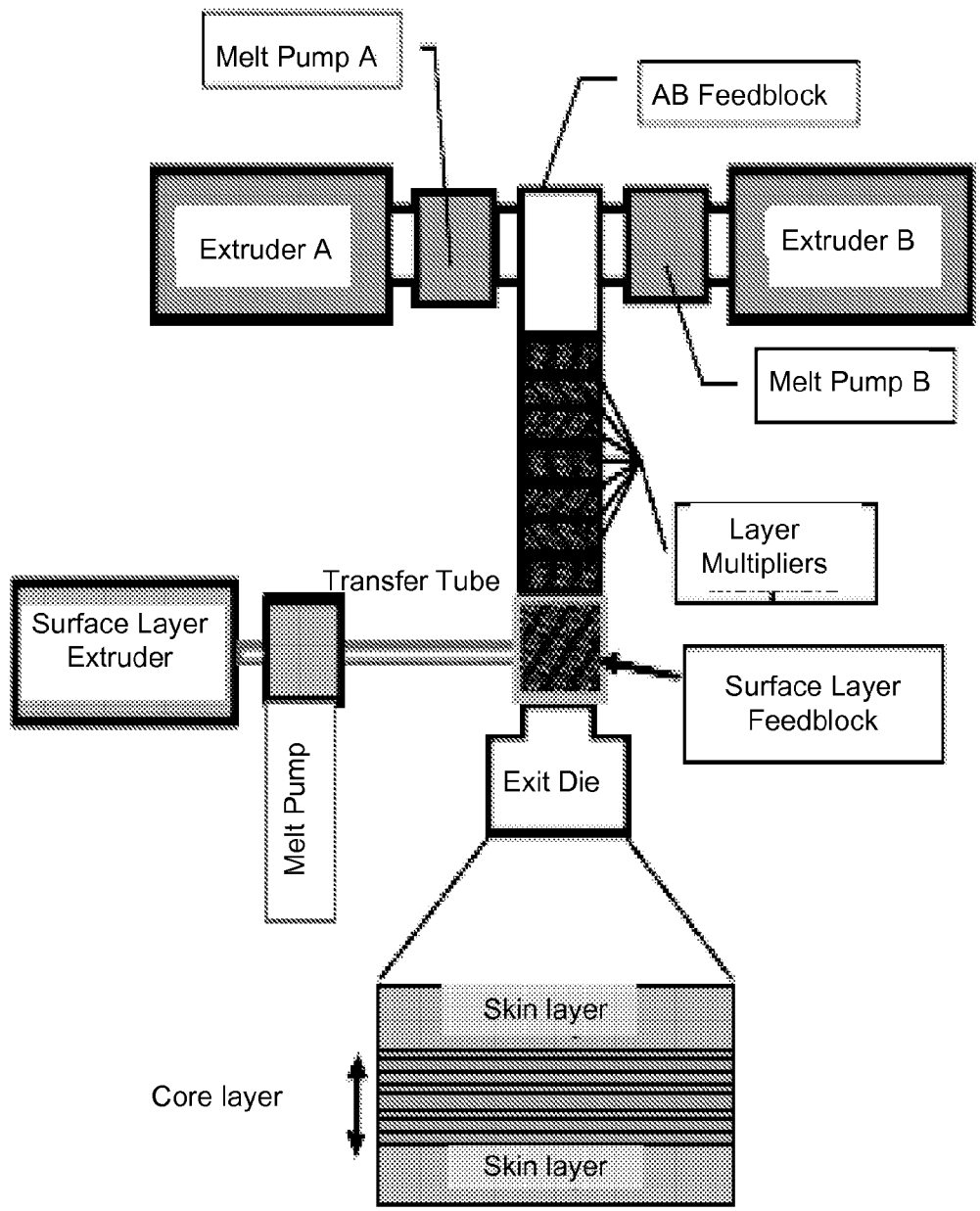
FIG. 4 illustrates a schematic of the co-extruder used to manufacture the multilayer films.

In the two-component, multilayered optical information storage medium described above, the optical information storage medium may be prepared by multilayered co-extrusion. For example, the structure may be formed by forced assembly co-extrusion in which two or more layers (A) and (B) are layered and then multiplied several times. A typical multilayer coextrusion apparatus is illustrated in FIG. 4. The two component (AB) coextrusion system consists of two ¾ inch single screw extruders each connected by a melt pump to a coextrusion feedblock. The feedblock for this two component system combines polymeric material (A) and polymeric material (B) in an (AB) layer configuration. The melt pumps control the two melt streams that are combined in the feedblock as two parallel layers. By adjusting the melt pump speed, the relative layer thickness, that is, the ratio of A to B can be varied. From the feedblock, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)_x$ where x is equal to $(2)^n$ and n is the number of multiplying elements. It is understood by those skilled in the art that the number of extruders used to fabricate the structure of the invention equals the number of components. Thus, a three-component multilayer (ABC . . . ), requires three extruders.

The multilayer structure formed by the coextrusion process is in the form of film or sheet, such as a free-standing flexible film or sheet. By altering the relative flow rates or the number of layers, while keeping the film or sheet thickness constant, the individual layer thickness can be controlled. This extrusion process results in large area multilayer films, e.g., feet wide by yards wide, consisting of tens or hundreds or thousands of layers with individual layer thicknesses as thin as 5 nm. The co-extruded optical information storage medium may have an overall thickness ranging from about 10 nm to about 10 cm, in particular from about 25 µm to about 3 cm including any increments within these ranges.

The fabricated multilayered composite optical information storage medium is suitable for use as a writable, readable, and erasable medium for 3-D data or voxels. In one example, an excimer-forming fluorescent or aggregachromic dye within an active data storage layer (A) can be stimulated via light, although alternative stimuli, such as exposure to chemicals or mechanical forces may likewise be used. The writing mechanism includes two-photon absorption properties of the dye, which allows light-absorption only at the focal point of the writing beam. A portion of the energy thus absorbed is converted into heat, which in turn causes the dye to disperse locally, i.e., around the focal point, leading to a pronounced, local, fixed change of the emission color.

When, for example, a cyano-OPV C18-RG dye is used in the active data storage layer (A), the emission can be switched between orange and green to write data to the optical information storage medium and, thus, appropriate filtering can be used to subsequently read the written data. The planar and axial location during reading is determined by the location of the reading lens. The axial resolution is enhanced by a confocal arrangement. The combination of two-photon absorption with a tightly focused laser beam of appropriate wavelength allows the written voxel to be located in the axial direction.

When it is desirable to erase part or all of the data written to the optical information storage medium, the particular active data storage layers (A) are again exposed to an external stimuli, e.g., light or heat, in order to reverse the dye aggregation, thereby erasing all the data stored therein. The writing, reading and erasing process can be carried out as many times as desired.

In other embodiments, a non-active layer of material may be coextensively disposed on one or both major surfaces of the multilayer film. The composition of the layer, also called a skin layer, may be chosen, for example, to protect the integrity of the optical information storage medium, to add mechanical or physical properties to the multilayer film or to add optical functionality to the multilayer film. Materials may include the material of one or more of the active data storage layers or buffer layers. Other materials with a melt viscosity similar to the extruded active data storage layers or buffers layers may also be useful.

A skin layer or layers may reduce the wide range of shear intensities the extruded multilayer stack might experience within the extrusion process, particularly at the die. A high shear environment may cause undesirable deformations in the multilayer film. Alternatively, if local variation of color is a desired effect, decorative layer distortions can be created by mismatching viscosity of the layers and/or skins, or processing with little or no skins, such that at least some of the layers undergo local thickness deformations, resulting in decorative colored effects. A skin layer or layers may also add physical strength to the resulting composite multilayer film or reduce problems during processing, such as, for example, reducing the tendency for the multilayer film to split during subsequent positioning. Skin layer materials which remain amorphous may tend to make films with a higher toughness, while skin layer materials which are semi-crystalline may tend to make films with a higher tensile modulus. Other functional components such as antistatic additives, UV absorbers, dyes, antioxidants, and pigments, may be added to the skin layer, provided they do not substantially interfere with the desired properties of the optical information storage medium.

Skin layers or coatings may also be added to impart desired bather properties to the resulting multilayer film or optical information storage medium. Thus, for example, barrier films or coatings may be added as skin layers, or as a component in skin layers, to alter the transmissive properties of the multilayer film or optical information storage medium towards liquids, such as water or organic solvents, or gases, such as oxygen or carbon dioxide.

Skin layers or coatings may also be added to impart or improve abrasion resistance in the resulting multilayer film or optical information storage medium. Thus, for example, a skin layer comprising particles of silica embedded in a polymer matrix may be added to a multilayer film described herein to impart abrasion resistance to the film, provided, of course, that such a layer does not unduly compromise the optical properties.

Skin layers or coatings may also be added to impart or improve puncture and/or tear resistance in the resulting multilayer film or optical information storage medium. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and active data storage layers and buffer layers, viscoelastic response, thermal stability at use temperatures, weatherability, ability to adhere to coatings and permeability to various gases and solvents. Puncture or tear resistant skin layers may be applied during the manufacturing process or later coated onto or laminated to the multilayer film. Adhering these layers to the multilayer film during the manufacturing process, such as by a coextrusion process, provides the advantage that the multilayer film is protected during the manufacturing process. In some embodiments, one or more puncture or tear resistant layers may be provided within the multilayer film, either alone or in combination with a puncture or tear resistant skin layer.

The skin layers may be applied to one or two sides of the extruded multilayer film at some point during the extrusion process, i.e., before the extruded and skin layer(s) exit the extrusion die. This may be accomplished using conventional coextrusion technology, which may include using a three-layer coextrusion die. Lamination of skin layer(s) to a previously formed multilayer film is also possible.

In some applications, additional layers may be coextruded or adhered on the outside of the skin layers during manufacture of the multilayer films. Such additional layers may also be extruded or coated onto the multilayer film in a separate coating operation, or may be laminated to the multilayer film as a separate film, foil, or rigid or semi-rigid substrate such as-polyester (PET), acrylic (PMMA), polycarbonate, metal, or glass.

A wide range of polymers can be used for the skin layers. Of the predominantly amorphous-polymers, examples include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials. Skin layers that may be used to increase the toughness of the multilayer film include high elongation polyesters and polycarbonates. Polyolefins, such as-polypropylene and polyethylene, may also be used for this purpose, especially if they are made to adhere to the multilayer film with a compatibilizer.

In other embodiments, various functional layers or coatings may be added to the multilayer film and optical information storage medium to alter or improve their physical or chemical properties, particularly along the surface of the film or optical information storage medium. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the film or optical information storage medium.

In some applications, as where the multilayer film is to be used as a component in adhesive tapes, it may be desirable to treat the multilayer films with low adhesion backside (LAB) coatings or films, such as those based on urethane, silicone or fluorocarbon chemistry. Films treated in this manner will exhibit proper release properties towards pressure sensitive adhesives (PSAs), thereby enabling them to be treated with adhesive and wound into rolls. Adhesive tapes made in this manner can be used for producing information storage documents, such as bar codes, stickers, and tamper resistant packaging.

The multilayer film and optical information storage medium may also be provided with one or more conductive layers. Such conductive layers may comprise metals such as silver, gold, copper, aluminum, chromium, nickel, tin, and titanium, metal alloys such as silver alloys, stainless steel, and INCONEL, and semiconductor metal oxides such as doped and undoped tin oxides, zinc oxide, and indium tin oxide (ITO).

The multilayer film and optical information storage medium may also be provided with antistatic coatings or films. Such coatings or films include, for example, $V_2O_5$ and salts of sulfonic acid polymers, carbon or other conductive metal layers.

The multilayer film and optical information storage medium may also be provided with one or more barrier films or coatings that alter the transmissive properties of the multilayer film towards certain liquids or gases. Thus, for example, the films and optical devices of the present invention may be provided with films or coatings that inhibit the transmission of water vapor, organic solvents, $O_2$, or $CO_2$ through the film. Barrier coatings will be particularly desirable in high humidity environments, where components of the film or device would be subject to distortion due to moisture permeation.

The multilayer film and optical information storage medium may also be treated with flame retardants, particularly when used in environments, such as on airplanes that are subject to strict fire codes. Suitable flame retardants include aluminum trihydrate, antimony trioxide, antimony pentoxide, and flame retarding organophosphate compounds.

The multilayer film and optical information storage medium may further be laminated to rigid or semi-rigid substrates, such as, for example, glass, metal, acrylic, polyester, and other polymer backings to provide structural rigidity, weatherability, or easier handling. For example, the multilayer film and optical information storage medium may be laminated to a thin acrylic or metal backing so that it can be stamped or otherwise formed and maintained in a desired shape. For some applications, such as when the optical film is applied to other breakable backings, an additional layer comprising PET film or puncture-tear resistant film may be used.

The multilayer film and optical information storage medium may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the multilayer film and optical information storage medium for specific applications. These include, but are not limited to, magnetic or magneto-optic coatings or films; reflective layers or films; semi-reflective layers or films; prismatic films, such as linear Fresnel lenses; brightness enhancement films; holographic films or images; embossable films; anti-tamper films or coatings; IR transparent film for low emissivity applications; release films or release coated paper; polarizers or mirrors; and layers for depth tracking, storing metadata or cryptographic information.

Multiple additional layers within the multilayer film, or on one or both major surfaces of the multilayer film are contemplated, and can be any combination of aforementioned coatings or films. For example, when an adhesive is applied to the multilayer film, the adhesive may contain a white pigment such as titanium dioxide to increase the overall reflectivity, or it may be optically transparent to allow the reflectivity of the substrate to add to the reflectivity of the multilayer film.

In order to improve roll formation and convertibility of the film, the multilayer film may also comprise a slip agent that is incorporated into the film or added as a separate coating. In most applications, slip agents will be added to only one side of the film, ideally the side facing the rigid substrate in order to minimize haze.

The multilayer film and optical information storage medium may also include one or more anti-reflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the multilayer film and optical information storage medium through appropriate surface treatment, such as coating or sputter etching.

The multilayer film and optical information storage medium may also be provided with a film or coating which imparts anti-fogging properties. In some cases, an anti-reflection layer as described above will serve the dual purpose of imparting both anti-reflection and anti-fogging properties to the multilayer film and optical information storage medium. Various anti-fogging agents are known to the art. Typically, however, these materials will contain substances, such as fatty acid esters, which impart hydrophobic properties to the film surface and which promote the formation of a continuous, less opaque film of water.

The multilayer film and optical information storage medium may be protected from UV radiation through the use of UV stabilized films or coatings. UV stabilized films and coatings include those which incorporate benzotriazoles or hindered amine light stabilizers (HALS), both of which are available commercially from Ciba Geigy Corp., Hawthorne, N.Y. Other UV stabilized films and coatings include those which contain benzophenones or diphenyl acrylates, available commercially from BASF Corp., Parsippany, N.J. Such films or coatings will be particularly important when the multilayer film and optical information storage medium are used in outdoor applications or in luminaires where the source emits significant amount of light in the UV region of the spectrum.

Adhesives may be used to laminate the optical multilayer film and optical information storage medium to another film, surface, or substrate. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous-polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, the adhesives can contain additives such as tackifiers, plasticizers, fillers, antioxidants, stabilizers, pigments, diffusing particles, curatives, and solvents. When a laminating adhesive is used to adhere a multilayer film to another surface, the adhesive composition and thickness can be selected so as not to interfere with the optical properties of the multilayer film. For example, the laminating adhesive should be optically clear in the wavelength regions that are desired to read/write the optical information storage medium.

In some embodiments, the multilayer films may be provided with one or more layers having continuous and disperse phases in which the interface between the two phases will be sufficiently weak to result in voiding during orienting the multilayer film. The average dimensions of the voids may be controlled through careful manipulation of processing parameters and stretch ratios, or through selective use of compatibilizers. The voids may be back-filled in the finished product with a liquid, gas, or solid. Voiding may be used in conjunction with the specular optics of the multilayer film to produce desirable optical properties in the resulting film.

In still other embodiments, the multilayer film and optical information storage medium may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

The optical information storage medium described herein can be used or implemented in any three-dimensional optical data information device. By the language three-dimensional it is meant that the optical information storage medium contained therein or which itself constitutes the device has the ability to store optical data in three dimensions through its volume. It will be appreciated, that devices herein may also be used for two-dimensional information storage. The information, which may be stored, on the devices may for example be binary digit or bit data that can be converted from an electronic signal to an optical signal for storage. The read optical signal may then be converted back to an electronic signal. Processes for conversion of electronic signals to optical signals and vice versa are well recognized in the art.

In some embodiments, the device constitutes simply the optical information storage medium itself, which takes the form of the multilayer film. In other embodiments, the optical information storage medium may include a substrate onto which or about which the multilayer film is located. For example the substrate may be glass, ceramic, plastics or other suitable, preferably inert material. The substrate can take the form of a protective coating surrounding or containing the multilayer film of the optical information storage medium. In some embodiments, at least a region of the substrate, in the case where it surrounds or contains the multilayer film, allows the transmission of electromagnetic radiation and in particular ultraviolet, visible and infra-red light. It may be the case that the optical data storage device takes the form of a card or disc which may conveniently be inserted into information technology equipment, such as computers, computer operated devices, hi-fi equipment, video equipment or the like. In such devices a transparent window may be provided within the cover through which data can be stored (written) or retrieved (read) to or from the device. For example, the devices may take the shape or configuration of conventional computer disks, CDs or DVDs. These possibilities are mentioned by way of example only and are not intended to be limiting upon the scope of the invention.

Figure 3:
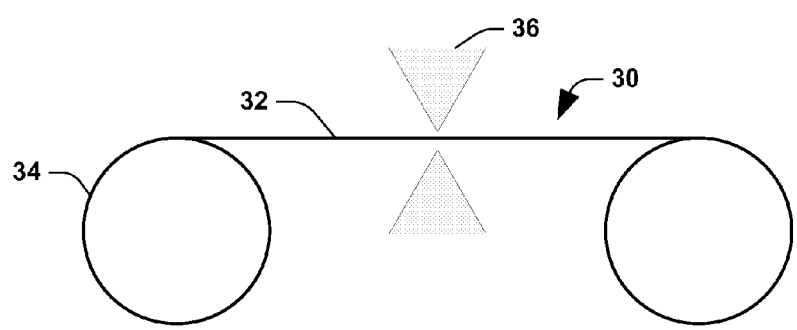
FIG. 3 is a schematic illustration of an optical information storage medium in accordance with another aspect of the application.

In other embodiments, as shown schematically in FIG. 3, the optical information storage medium 30 can be provided as a long (e.g., 100 m) continuous optical data storage tape 32. The tape 32 can be formed of a mechanically flexible multilayer film as described herein that can be provided on a roll or drum 34. The tape 32 can be fed through a read/write system 36 for reading and writing the tape 32. The read/write system 36 can include an appropriate permanent or reversible one- or multiphoton, linear, nonlinear, or threshold optical device for defining discrete data voxels within the active data storage layers of the tape 32 and an optical reading device for reading discrete voxels defined within the active data storage layers.

In yet other embodiments, the optical information storage medium can be incorporated into or provided on an information bearing document. The information bearing document can include any type of information bearing document, including (but not limited to), documents, bank notes, securities, stickers, foils, containers, product packing, checks, credit cards, bank cards, phone cards, stored value cards, prepaid cards, smart cards (e.g., cards that include one or more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, and tags. It is even contemplated that the optical information storage medium may have applicability for devices such as, consumer products, knobs, keyboards, electronic components, etc., or any other suitable items or articles that may record information, images, and/or other data, which may be associated with a function and/or an object or other entity to be identified. Note also that, for the purposes of this disclosure, the terms "document," "card," "badge" and "documentation" are used interchangeably.

The following example further illustrates the optical information storage medium described herein. The example is intended to be merely illustrative and is not to be construed as being limiting.

EXAMPLE

This Example describes a co-extrusion process for fabricating roll-to-roll multilayer (ML) films for high-density optical data storage system ODS. This process can easily produce a continuous, complete storage medium hundreds of meters in length and meters in width, ready for a variety of formats with total writable areas sufficient for terabyte to petabyte-scale capacity. The co-extrusion process is also low-cost and far simpler than current manufacturing approaches, such as spin-coating and lamination.

This Example also demonstrates data storage in 23 layers of a 78 µm thick, 100 m long ML tape using a continuous-wave Blu-Ray (BR) laser by fluorescence (FL) quenching of an organic dye. The areal density is found to be similar to that of commercial discs, and the small layer spacing allowed by a FL-based scheme leads to a bit density of $1.2 \times 10^{12}$ cm$^{-3}$. Given the mechanism and high axial density, the cross-talk during writing is also examined. The approach is generic so that materials already developed for high-density ODS can be exploited for innovations including "cloud"-scale data storage.

Materials

The chromophore C18-RG was synthesized using a known process. PETG Eastar 6763 were obtained from Eastman Chemical Company and used as received. A blend of C18-RG and PETG (nominal dye content 2 wt. %) was prepared using a Haake Rheocord 9000 batch mixer at 230° C. for 5 minutes.

Co-Extrusion

The PETG/dye blend and PVDF were loaded into separate hoppers and heated to 230° C. where the polymers have matching viscosities. The bilayer extruded after these hoppers were sent sequentially through 5 dies. Each die cut perpendicular to the bilayers, spread, and stacked the film to multiply the number of layers by 2. The final film produced was a system of 64 layers with an overall thickness of approximately 200 µm.

Absorption and Fluorescence

The absorption spectrum was measured using a Cary 500 spectrophotometer on the entire 200 µm thick, ML film with 64 active layers. The FL was measured using the confocal microscope fiber-coupled to an Acton 2300i spectrometer and a Princeton PIXIS 100BR CCD. A square region was first read using the same parameters as for reading the images (vide infra) except the scan rate was 6 µm ms$^{-1}$ to reduce the signal-to-noise ratio. Then, the square region was written using the same parameters as for writing the images and it was rescanned at the lower power to measure the spectra after bleaching.

Writing and Reading

To write the data, the laser was focused into the film through an Olympus M Plan Apochromat, 100×, 1.4 NA oil-immersed objective. Patterns were recorded using an Olympus FV1000 confocal microscope by scanning the laser beam along a customized path at a rate of 75 nm ms$^{-1}$. The incident power was about 150 µW and the intensity was varied from 1.0 mW µm$^{-2}$ (topmost) to 1.5 mW µ$^{-2}$ (lowest layer). The reading was performed in the same setup, except at a faster rate and much reduced power (0.01 mW µm$^2$ at 5 µm ms$^{-1}$) to avoid destructive read-out. An intensity on the order of 0.1 mW µm$^{-2}$ or greater is required to obtain measurable quenching with sub-ms exposures.

Calculations of the Layer Cross-Talk

The theoretical curves for the bit cross-talk shown in FIG. 8c were calculated as follows. The relevant parameter, physically, is the ratio of the intensity received at a given bit location during explicit writing of that bit relative to that obtained during writing of all other bits in all other layers. The simulated bit array consists of $N_z$ layers with a spacing of $\Delta_z$, each consisting of $N_y$ by $N_x$ bits, with spacings of $\Delta_y$ and $\Delta_x$, respectively. The bit array occupies a volume of size $L_x$ by $L_y$ by $L_z$. The origin is placed at the center of the data array. Assuming a diffraction-limited Gaussian beam, the reduction in the FL a single bit located at the origin during explicit writing of that bit (the signal, S) should be proportional to some power of the fluence $$S = C \frac{e^{-\alpha N_z \Delta z / 2}}{\pi w_0^2}$$

where C is a proportionality constant, α is the absorption coefficient, and $w_0$ is the beam waist. The FL reduction of this same bit during writing of all the other bits (the noise, N) is given by the sum $$N = C \sum_{k=-N_z/2}^{N_z/2} \left[ \frac{e^{-\alpha N_z \Delta z / 2}}{\pi w_0^2} \sum_{j=-N_y/2}^{N_y/2} \sum_{i=-N_x/2}^{N_x/2} e^{-2(i\Delta x)^2/w_k^2} e^{-2(j\Delta y)^2/w_k^2} \right] - S$$

and the $1/e^2$ beam radius, $w_k$, at the z-origin when writing layer k is given by $$w_k = w_0 \sqrt{1 + \left(\frac{\lambda k \Delta z}{n \pi w_0^2}\right)^2}$$

where n is the refractive index, and λ is the writing wavelength. S is subtracted from this to account for the single term in the sum which is defined as the signal. This can be greatly simplified assuming a highly focused beam and a large scan area. However it is more accurate to simply perform the summation numerically (Matlab). The parameters were chosen to correspond to those used during writing. The bit spacing was chosen as 1.0 µm in both lateral dimensions with all bits being "on" (numerically equivalent to the "on-off" pattern of 0.5 µm spacing produced by the square wave generator), $\Delta_z$=3 µm, $N_x$=$N_y$=40, $N_z$=10, $L_x$=$L_y$=40 µm, $L_z$=27 µm, and $w_0$=0.32 µm. A beam waist corresponding to the experimentally observed value of 0.32 µm is used. The result plotted in FIG. 8c is the ratio S/N. S corresponds to the modulation signal, while the total N results in overall constant bleaching, so this ratio can be determined from the experimental data by calculating $$\frac{\max - \min}{1 - \max},$$

where max is the average of the peak values in the modulation and min is the average of the troughs.

This calculation is intended only as an order-of-magnitude comparison, as there are many other physical processes that must be taken into when designing an optimal ML structure, such as multiple reflections. One of the primary differences between experiment and theory here is the fact that the beam is scanned continuously and not discretely. Furthermore, for large intensities the bleaching will become sub-linear, which is not accounted for in the theory. The light scattered at the interfaces and the inability to control all aspects of the confocal writing system on small scales (such as the retrace and sample positioning) also contribute to the carrier-to-background ration (CBR). Many of these will increase the empirical background, decreasing the CBR compared to theory, as observed.

Layer Spacing Limits and Optical Systems

The use of the FL detection schemes allows smaller layer spacings compare to schemes relying on phase changes and reflection. Another limiting factor is the response function of the reading system itself. The confocal microscope used here, with a 1.4 numerical aperture (NA) objective, is an extreme case. With these optics, the intensity at the detector plane drops by half if the sample is moved by about 0.1 µm axially out of the focal plane (for an infinitely small aperture), which is much smaller than the layer spacing. If instead the 0.85 NA objective found in BR players is used, even with an aperture diameter a factor of 10 larger than the spot size at the detector, this figure is still only 0.89 µm. Thus, while the factors limiting the minimum layer spacing are relaxed here, the optical limit of the reading system is not yet an issue.

Results

We employed highly transparent multilayer (ML) polymer films with a fluorescent (FL) organic molecule in the active layers. The FL mechanism is used because, for the large number of layers produced and recorded here, coherent crosstalk during reading would occur with reflective schemes. The co-extrusion technique used to manufacture these films is illustrated in FIG. 4. In this process, two thermoplastic polymers (A and B) are heated to form a melt with matching viscosities, and then coextruded into a bilayer feedblock. The AB bilayer is sent through a series of multiplication dies, which cut, spread, and stack the melt, doubling the number of layers each time. The process employed in this Example allows fabricating films up to 36 cm in width and 200 µm in thickness at a speed of approximately 200 m hr$^{-1}$, which can be scaled up in commercial applications. The production process has broader applicability than just to the particular dye/polymer system described herein, and can be used to realize more sophisticated device architectures, such as multiple functional dopants or distinct layers, or even metal reflective layers that are needed for phase change materials.

Using this technique, we fabricated a storage system consisting of 23 data storage layers interleaved between inactive buffer layers, which serve to confine the bits within discrete regions. A roll of film produced in this Example possessed a writable area factor of 1000 more than conventional discs. Note that, as a continuous process, the method could produce samples of unlimited length. Data storage layer A is composed of a transparent host polymer, poly(ethylene terephthalate glycol) (PETG) that is doped with 2.0 wt. % of the fluorescent chromophore 1,4-bis(α-cyano-4-octadecyloxy-styryl)-2,5-dimethoxy-benzene (C18-RG, FIG. 5a). Buffer layer B consisted of poly(vinylidene fluoride) (PVDF), is optically inactive and refractive index-matched to layer A. This material is particularly effective in limiting diffusion of the dye during processing. The average thicknesses of layers A and B are 0.3 and 3.1 µm, respectively.

C18-RG is a cyano-substituted oligo(p-phenylene vinylene) dye exhibiting both excimer and monomer states, which we have previously used for ODS by two-photon absorption. If molecularly dispersed in PETG, the monomer exhibits absorption and FL peaks at 450 and 510 nm, respectively. The excimer exhibits absorption and FL peaks at 370 and 540 nm, respectively. The absorbance and FL spectra are shown in FIG. 5B, along with the FL spectra after photobleaching by 20%, approximately the same level used during data writing. Note that the quenching is fairly uniform in the region of the peaks, indicating no shift in the relative concentration of monomers and excimers. In this work, molecularly dispersed dye in PETG was used for data storage by bleaching the green FL using single photon absorption.

The data writing was performed using a 405 nm continuous-wave laser beam focused onto the chosen layer, making the process compatible with compact BR sources. The FL changes caused by writing were observed to be permanent and stable over the time period of more than 2 years. FIG. 6A depicts FL images written into the storage layers. The written regions correspond to areas of reduced FL intensity (black). Here writing was performed using a scanning confocal microscope, layer-by-layer from the lowest to the topmost storage layer. The same confocal microscope and laser source subsequently collected 3D FL images of the sample at a reduced intensity and increased scan rate.

FIG. 6B shows a cross-section of two adjacent layers after writing simple geometric images. Even though the images are complementary, the data in each layer is distinct and sufficiently confined to the layer of interest. From the images shown in FIGS. 6a and 6b, it is evident that data can readily be recorded and retrieved from each of the individual storage layers. FIG. 6a also shows that the quality of the retrieved images decreases for the deeper layers due to aberrations, which can be improved with a longer working distance objective. However, it is readily possible to retrieve information from 23 layers, which is the largest number of recorded layers that has been reported in a heterogeneous ML ODS medium.

The axial spacing of state-of-the-art, two to four layer BR discs is greater than 10 µm in order to limit the coherent cross-talk that occurs due to multiple reflections of the reading beam at the reflective layer and spacer layer interfaces. The FL detection scheme employed here greatly reduces the multiple reflections as well as emitting at a non-degenerate wavelength, allowing much smaller spacing to be used. Thus, the spacing of our layers (3 µm) is one of the smallest explored. The areal density of ODS, on the other hand, is constrained by the beam waist at the diffraction limit. To examine the data bit dimension of our ML films, single lines were written into a monolithic film of the active layer under the same writing conditions as used above. The resulting profile is shown in FIG. 7. A fit yields a full-width-half-maximum (FWHM) of 380 nm, which is approximately the minimum bit spacing achievable in the current system, and is consistent with the diffraction-limited beam size.

Optical aberrations limit the thickness of BR discs to less than 140 µm. Given the close layer spacing and BR diffraction limited writing, the bit density achievable in our system is estimated to be $1.2 \times 10^{12}$ cm$^{-3}$. Thus, in a commercial disc format, our co-extruded medium is sufficient for TB storage within the BR system specifications. In particular setups, flexible films have even been shown to improve stability and writing speeds. In an alternative roll-based read/write system, approximately 150 m of this film would be needed to achieve petabyte (PB) capacities. Furthermore, one can trade-off fewer layers, to relax the optical constraints, for longer lengths which are still easily manufactured.

A significant factor that determines the minimum bit spacing in both the axial and lateral dimension is cross-talk, especially for these films with a large number of layers that are closely spaced. One attractive feature of ML films in the context of 3D storage is the confinement of the bits in the axial direction, which reduces cross-talk between neighboring bits and layers during writing and reading. To directly measure the writing cross-talk, an array of bits was written into 10 successive layers and the contrast modulation in the middle ("probe") layer was read as information was written in the others. Similar writing conditions as described above were employed. The laser was modulated with a square wave generator to produce on-off bit pairs separated by 1.0 µm in both lateral directions, and the total area written (40×40 µm) was larger than the beam diameter in any given layer, so as not to underestimate the total cross-talk between any two layers. This also leads to results that are not dependent on which of the 10 layers is chosen as the probe. A subsection of the FL pattern and modulation after select writing steps is shown in FIGS. 8A and B. The main effect of cross-talk appears to be an overall reduction in the average FL level.

The ratio of signal modulation to the background FL depletion (CBR) is used to quantify the cross-talk. The CBR after writing each of the 10 layers (starting with the probe layer) is plotted in FIG. 8C (triangles). The value decreases from 2 to 0.15 with increasing number of layers, and is in good agreement with numerical simulations (squares). While this is not insignificant, this CBR ratio is more than sufficient to resolve individual bit information, as shown in FIG. 6. Note that the total background depletion is accumulated over many small exposures, and due to the high numerical aperture of the writing objective and the inert buffer layers, the fluence in the layer adjacent to one that is being written, is reduced by more than a factor of 10. Thus, exposure while writing the bit of interest is still the dominant contribution compared to any other single exposure by about a factor of 100.

From the above description of the application, those skilled in the art will perceive improvements, changes and modifications. Such improvements, changes, and modifications are within the skill of those in the art and are intended to be covered by the appended claims. All patents, patent applications, and publication cited herein are incorporated by reference in their entirety.

Having described the invention, the following is claimed:

1. An optical information storage medium comprising a multilayer polymeric film that includes a plurality of coextruded alternating polymeric active data storage layers and polymeric buffer layers, which separate the active data storage layers, the active data storage layers including a fluorescent dye that undergoes a permanent optically induced localized nonlinear or threshold change of fluorescence intensity when written by a single wavelength nonlinear or threshold optical writing process with excitation within the absorption band of the fluorescent dye and at least one data voxel written below the diffraction limit and axially confined within a discrete active data storage layer of the active storage layers by the polymeric buffer layers adjacent to the discrete active data storage layer by the single wavelength nonlinear or threshold optical writing process, the active data storage layers and buffer layers having thicknesses that allow the active data storage layers to be writable by the single wavelength nonlinear or threshold optical writing process with excitation within the absorption band of the fluorescent dye to define the at least one data voxel within the discrete active data storage layer that is readable by an optical reading device.

2. The medium of claim 1, the at least one data voxel, comprising at least one of discrete bits, images, shapes, and/or holograms.

3. The medium of claim 1, the active storage layers having thicknesses less than the thicknesses of the buffer layers and the ratio of thicknesses of the active storage layers to the thicknesses of the buffers layers reducing cross-talk, increasing signal-to-noise ratio, and reducing parasitic optical absorption and/or scattering.

4. The medium of claim 1, the active data storage layers including a host polymer material and the fluorescent dye, the fluorescence intensity of the fluorescent dye being changed by the single wavelength nonlinear or threshold optical writing process with excitation within the absorption band of the dye to define the at least one data voxel within the discrete active data storage layer.

5. The medium of claim 1, the active storage layers including a first thermoplastic polymer and the buffer layers including a second thermoplastic polymer, the first thermoplastic polymer and the second thermoplastic polymer having matching viscosities upon melting that allow the alternating data storage layers and the buffer layers to be coextruded and form the multilayer film.

6. The medium of claim 1, the multilayer film including at least 30 alternating layers.

7. The medium of claim 1, the active data storage layers having thicknesses of about 5 nm to about 10 µm and the buffer layers having thicknesses of about 25 nm to about 100 µm and wherein the ratio of the thicknesses of the active data storage layers to the combined thickness of the active data storage layers and buffer layers is 0.05 to less than 1.

8. The medium of claim 1, the multilayer film being flexible.

9. The medium of claim 1, being a three-dimensional optical memory.

10. The medium of claim 1, being at least one of a tape, card, disc, cylinder, microfiche, microfilm, flexible or non-flexible substrate, or information bearing document.

11. The optical information storage medium of claim 1, wherein the fluorescent dye undergoes the permanent optically induced localized nonlinear or threshold change of fluorescence intensity when written by a modulated continuous wave laser beam emitting within the absorption band of the fluorescent dye focused on the discrete active data storage layer.

12. The optical information storage medium of claim 1, wherein the buffer layers have refractive indices that are matched to the refractive indices of the active data storage layers to allow the at least one data voxel to be writable by the single wavelength nonlinear or threshold optical writing process and readable by the optical reading device.

13. The medium of claim 1, wherein the absorption band of the fluorescent dye overlaps the emission spectrum of a laser used in the single wavelength nonlinear or threshold optical writing process.

14. An optical information storage medium comprising a multilayer polymeric film that includes a plurality of coextruded alternating thermoplastic active data storage layers and thermoplastic buffer layers, which separate the thermoplastic active data storage layers, the thermoplastic active data storage layers including a fluorescent dye that undergoes a permanent optically induced localized nonlinear or threshold change of fluorescence intensity when written by a single wavelength nonlinear or threshold optical writing process with excitation within the absorption band of the dye and at least one data voxel written below the diffraction limit and axially confined within a discrete thermoplastic active data storage layer of the thermoplastic active data storage layers by the thermoplastic polymeric buffer layers adjacent to the discrete thermoplastic active data storage layer by the single wavelength nonlinear or threshold optical writing process, wherein thicknesses of the thermoplastic active data storage layers and thermoplastic buffer layers allowing the active data storage layers to be writable by the single wavelength nonlinear or threshold optical writing process with excitation within the absorption band of the fluorescent dye to define the at least one data voxel within the discrete thermoplastic active data storage layer that is readable by an optical reading device and wherein the thermoplastic active data storage layers and thermoplastic buffer layers have matching melt viscosities that allow the alternating thermoplastic active data storage layers and the thermoplastic buffer layers to be coextruded and form the multilayer polymeric film.

15. The medium of claim 14, the at least one data voxel comprising at least one of discrete bits, images, shapes, and/or holograms.

16. The medium of claim 14, the active storage layers having thicknesses less than the thicknesses of the buffer layers and the ratio of thicknesses of the active storage layers to the thicknesses of the buffers layers reducing cross-talk, increasing signal-to-noise ratio, and reducing parasitic optical absorption and/or scattering.

17. The medium of claim 14, the active data storage layers including a host polymer material and the fluorescent dye, the fluorescence intensity of the fluorescent dye being changed by the single wavelength nonlinear or threshold optical writing process with excitation within the absorption band of the fluorescent dye to define the at least one data voxel within the discrete active data storage layer.

18. The medium of claim 14, the multilayer film including at least 30 alternating layers.

19. The medium of claim 14, the active data storage layers having thicknesses of about 5 nm to about 10 µm and the buffer layers having thicknesses of about 25 nm to about 100 µm and wherein the ratio of the thicknesses of the active data storage layers to the combined thickness of the active data storage layers and buffer layers is 0.05 to less than 1.

20. The medium of claim 14, the multilayer film being flexible.

21. The medium of claim 14, being a three-dimensional optical memory.

22. The medium of claim 14, being at least one of a tape, card, disc, cylinder, microfiche, microfilm, flexible or non-flexible substrate, or information bearing document.

23. The optical information storage medium of claim 14, wherein the fluorescent dye undergoes the permanent optically induced localized nonlinear or threshold change of fluorescence intensity when written by a modulated continuous wave laser beam emitting within the absorption band of the fluorescent dye focused on the discrete active data storage layer.

24. The optical information storage medium of claim 14, wherein the buffer layers have refractive indices that are matched to the refractive indices of the active data storage layers to allow the data voxels to be writable by the single wavelength nonlinear or threshold optical writing process and readable by the optical reading device.

25. The medium of claim 14, wherein the absorption band of the fluorescent dye overlaps the emission spectrum of a laser used in the single wavelength nonlinear or threshold optical writing process.

26. An optical data storage system comprising:
 a multilayer polymeric film that includes a plurality of coextruded alternating polymeric active data storage layers and polymeric buffer layers, which separate the active data storage layers, the active data storage layers including a fluorescent dye that undergoes a permanent optically induced localized nonlinear or threshold change of fluorescence intensity when written by a single wavelength nonlinear or threshold optical writing process with excitation within the absorption band of the fluorescent dye and at least one data voxel written below the diffraction limit and axially confined within a discrete active data storage layer of the active data storage layers by the polymeric buffer layers adjacent to the discrete active data storage layer, by the single wavelength nonlinear or threshold optical writing process, the active data storage layers and buffer layers having thicknesses that allow the active data storage layers to be writable by the single wavelength nonlinear or threshold optical writing process with excitation within the absorption band of the fluorescent dye to define the at least one data voxel within the discrete active data storage layer that is readable by an optical reading device;
 a single wavelength nonlinear or threshold optical writing device for defining the at least one data voxel within the discrete active data storage layer; and
 an optical reading device for reading the at least one data voxel defined within the discrete active data storage layer.

27. The optical data storage system of claim 26, wherein the multilayer polymeric film includes a plurality of coextruded alternating thermoplastic active data storage layers and thermoplastic buffer layers, which separate the thermoplastic active data storage layers, and wherein the thermoplastic active data storage layers and thermoplastic buffer layers have matching melt viscosities that allow the alternating data storage layers and the buffer layers to be coextruded and form the multilayer polymeric film.

28. The optical information storage system of claim 26, wherein the fluorescent dye undergoes the permanent optically induced localized nonlinear or threshold change of fluorescence intensity when written by a modulated continuous wave laser beam emitting within the absorption band of the fluorescent dye focused on the discrete active data storage layer.

29. The optical information storage system of claim 26, wherein the buffer layers have refractive indices that are matched to the refractive indices of the active data storage layers to allow the at least one data voxel to be writable by the single wavelength nonlinear or threshold optical writing process and readable by the optical reading device.

30. The system of claim 26, wherein the absorption band of the fluorescent dye overlaps the emission spectrum of a laser used in the single wavelength nonlinear or threshold optical writing process.

31. A method of storing data, the method comprising:
 providing a multilayer polymeric film that includes a plurality of alternating polymeric active data storage layers and polymeric buffer layers, which separate the active data storage layers, the active data storage layers including a material that undergoes a permanent optically induced localized nonlinear or threshold change of fluorescence intensity when written by a single wavelength nonlinear or threshold optical writing process with excitation within the absorption band of the material, the active data storage layers and buffer layers having thicknesses that allow the active data storage layers to be writable by the single wavelength nonlinear or threshold optical writing process with excitation within the absorption band of the material to define at least one data voxel within a discrete active data storage layer of the active data storage layers that are readable by an optical reading device; and
 writing at least one data voxel below the diffraction limit within the discrete active data storage layer and axially confined to the discrete active data storage layer by the polymeric buffer layers adjacent to the discrete active data storage layer using a single wavelength nonlinear or threshold optical writing process with excitation within the absorption band of the fluorescent material.

32. The method of claim 31, wherein the at least one data voxel is written by a modulated continuous wave laser beam in the absorbance band of the material focused on the discrete active data storage layer.

33. The method of claim 31, wherein the at least one data voxel comprises at least one of discrete bits, images, shapes, and/or holograms.

34. The method of claim 31, the active storage layers having thicknesses less than the thicknesses of the buffer layers and the ratio of thicknesses of the active storage layers to the thicknesses of the buffers layers reducing cross-talk, increasing signal-to-noise ratio, and reducing parasitic optical absorption and/or scattering.

35. The method of claim 31, wherein the buffer layers have refractive indices that are matched to the refractive indices of the active data storage layers to allow the at least one data voxel to be writable by the single wavelength nonlinear or threshold optical writing process and readable by the optical reading device.

36. The method of claim 31, the active data storage layers including a host polymer material and a fluorescent dye, the fluorescence intensity of the fluorescent dye being changed by the single wavelength nonlinear or threshold optical writing process with excitation within the absorption band of the material to define the at least one data voxel within the discrete active data storage layer.

37. The method of claim 36, wherein the absorption band of the fluorescent dye overlaps the emission spectrum of a laser used in the single wavelength nonlinear or threshold optical writing process.

38. The method of claim 31, the active storage layers including a first thermoplastic polymer and the buffer layers including a second thermoplastic polymer, the first thermoplastic polymer and the second thermoplastic polymer having matching viscosities upon melting that allow the alternating data storage layers and the buffer layers to be coextruded and form the multilayer film.

39. The method of claim 31, the multilayer film including at least 30 alternating layers.

40. The method of claim 31, the active data storage layers having thicknesses of about 5 nm to about 10 μm and the buffer layers having thicknesses of about 25 nm to about 100 μm and wherein the ratio of the thicknesses of the active data storage layers to the combined thickness of the active data storage layers and buffer layers is 0.05 to less than 1.

* * * * *